Sept. 5, 1939.  C. F. CARNEY ET AL  2,172,187
ELEVATOR SYSTEM
Filed Sept. 3, 1937   7 Sheets-Sheet 1
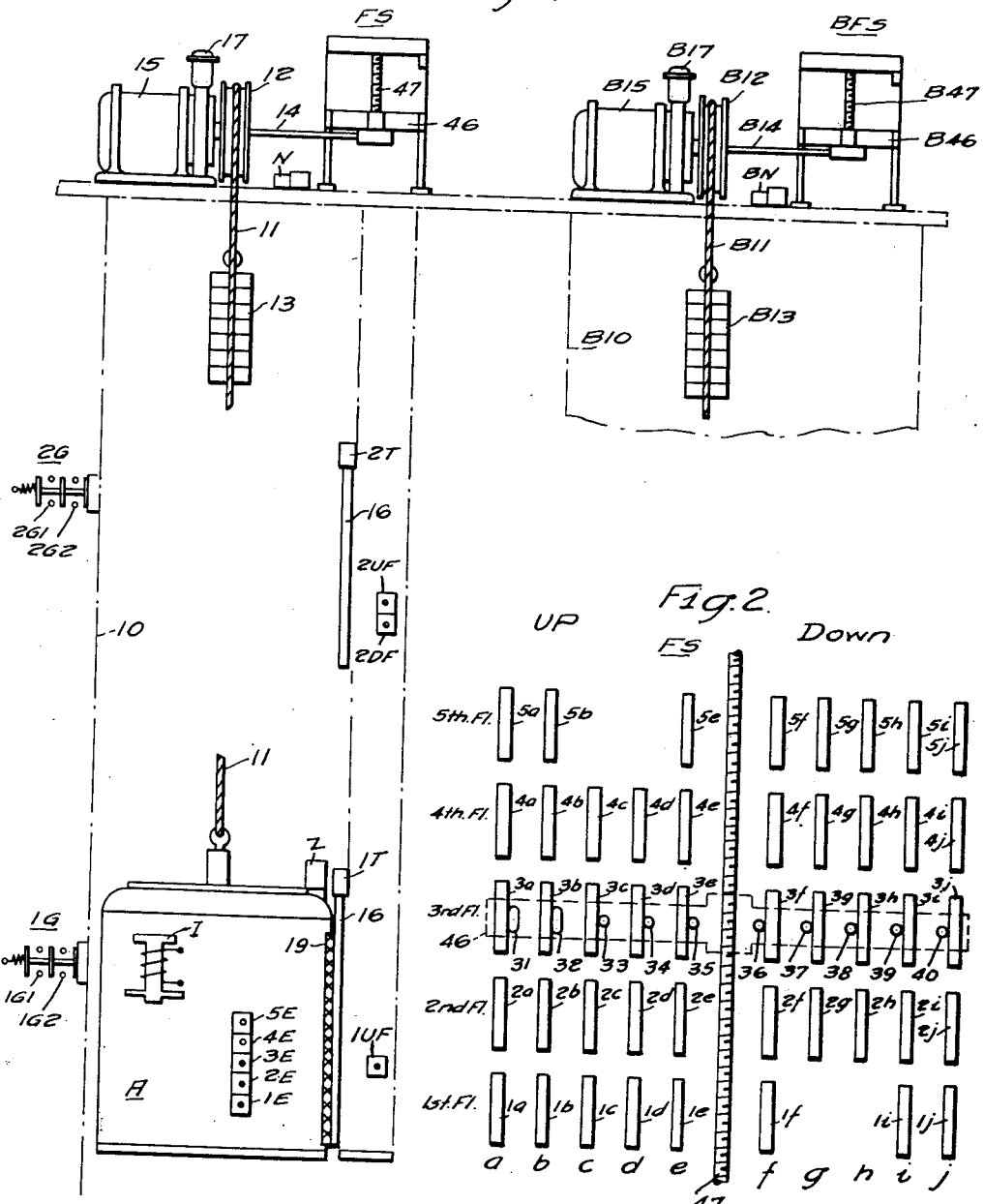

Patented Sept. 5, 1939

2,172,187

UNITED STATES PATENT OFFICE 2,172,187

ELEVATOR SYSTEM

Charles F. Carney and James M. Gasprich, Chicago, Ill., assignors to Westinghouse Electric Elevator Company, Chicago, Ill., a corporation of Illinois Application September 3, 1937, Serial No. 162,245

10 Claims. (Cl. 187—29)

Our invention relates to control systems for passenger operated elevators and more particularly to elevator systems of this kind in which the hatchway doors and car gates operate automatically.

In elevator systems of this nature, the passenger can call the cars to them by pressing hall push buttons at the floor landings and can then cause the cars to take them to their destinations by pressing push buttons in the cars. Where such systems have been provided with automatic power actuated doors, it has been customary to park the cars with their gates and the hatchway doors standing open. However, under this system, when a car is called to another floor, it is necessary to have its gate and door close first before it can start to answer its call. The act of closing the door and the gate before the car can start necessarily consumes some time before the car can get under way.

Therefore, one of the objects of our invention is to provide a passenger operated elevator system in which the cars may be parked with their gates and doors closed so that any chosen car will be ready to respond immediately to a call for service at any other floor, thereby avoiding the necessity of having to wait until its gate and door close, as in usual practice.

A further object is to provide a manually operated means for so setting the system that a chosen car will be the one to open its gate and door when several cars are parked at a floor and a call for service is received at that floor.

Another object is to provide a system in which the operation of a call push button at a floor common to all the cars serving that floor will effect the opening of the car gate and hatchway door of any car parked at that floor when it is the only car parked at that floor.

It is also an object of our invention to so combine and control the operation of the doors and gates and cars in passenger operated elevator systems as to secure as high a degree of efficiency as possible in the operation of the cars in answering passenger calls.

Figure 3:
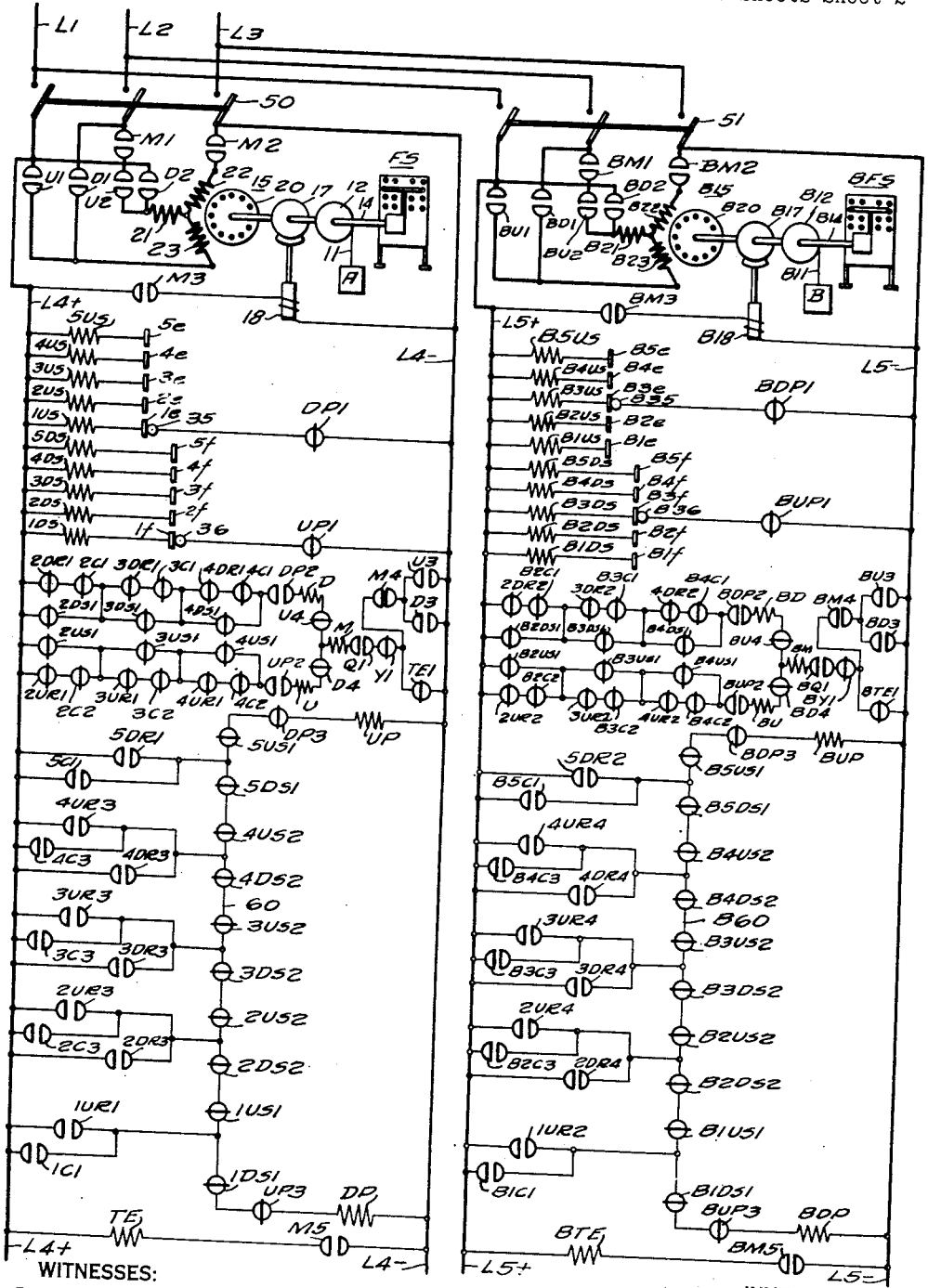
Figure 3A:
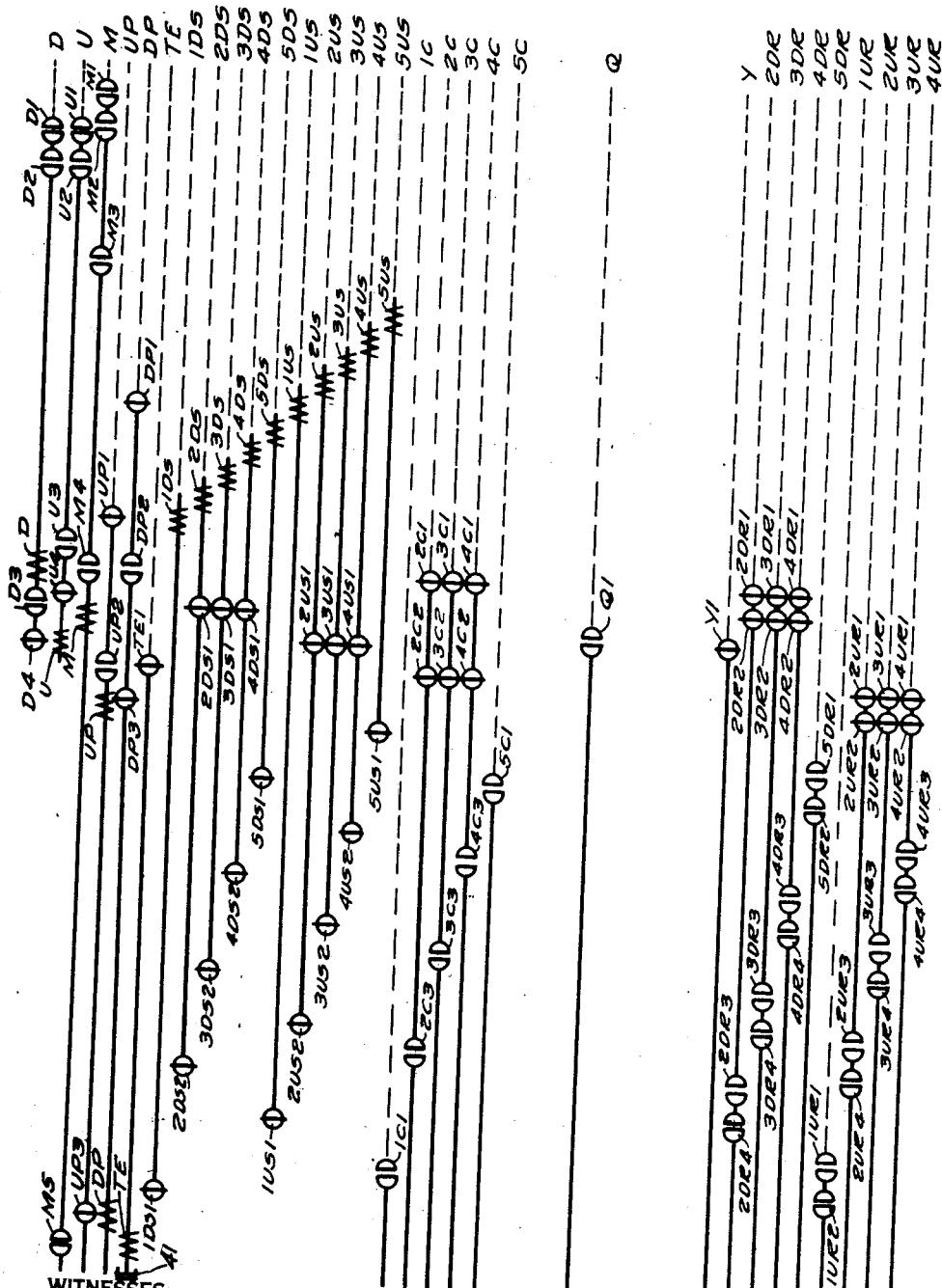
Figure 4A:
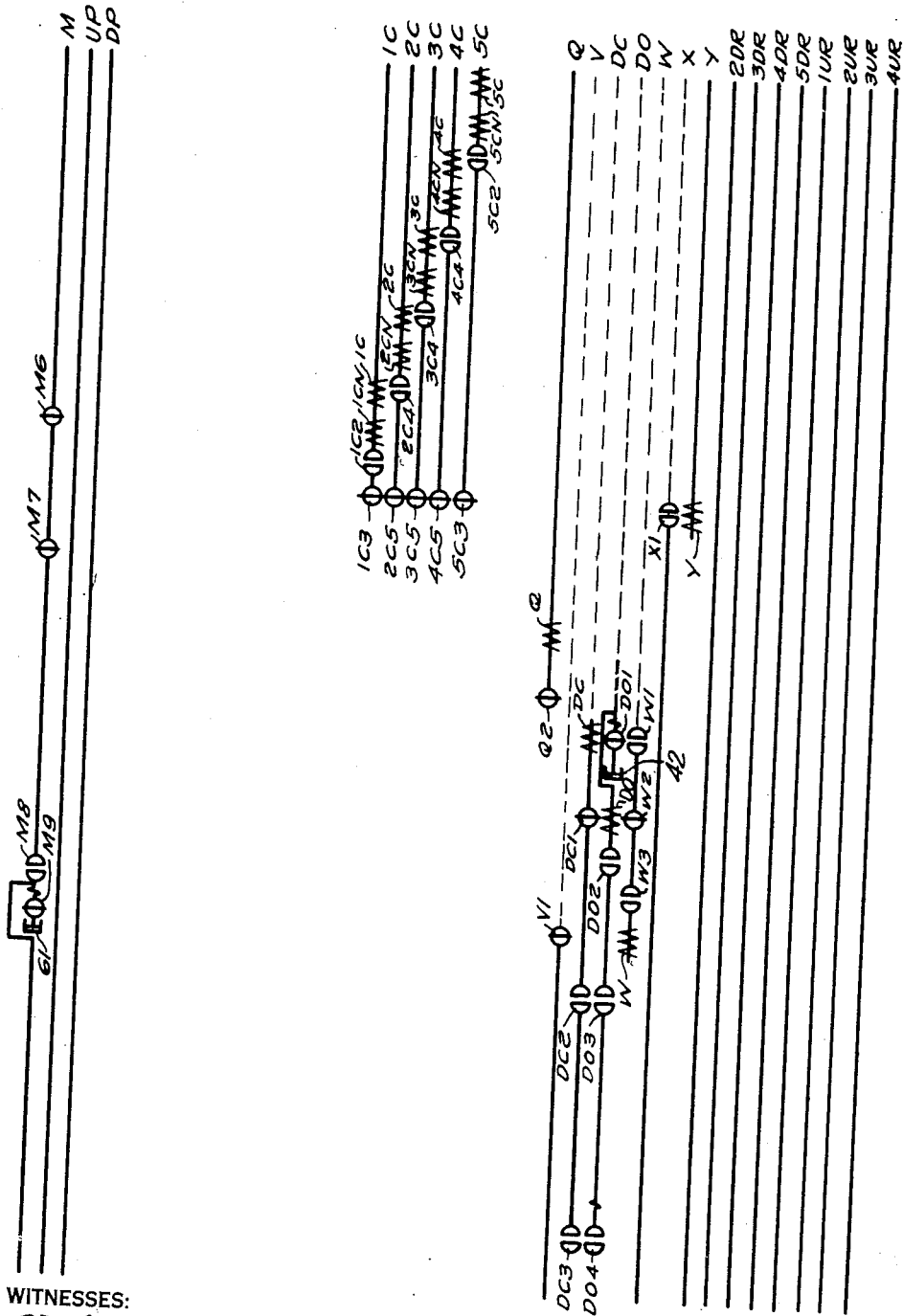
Figure 4:
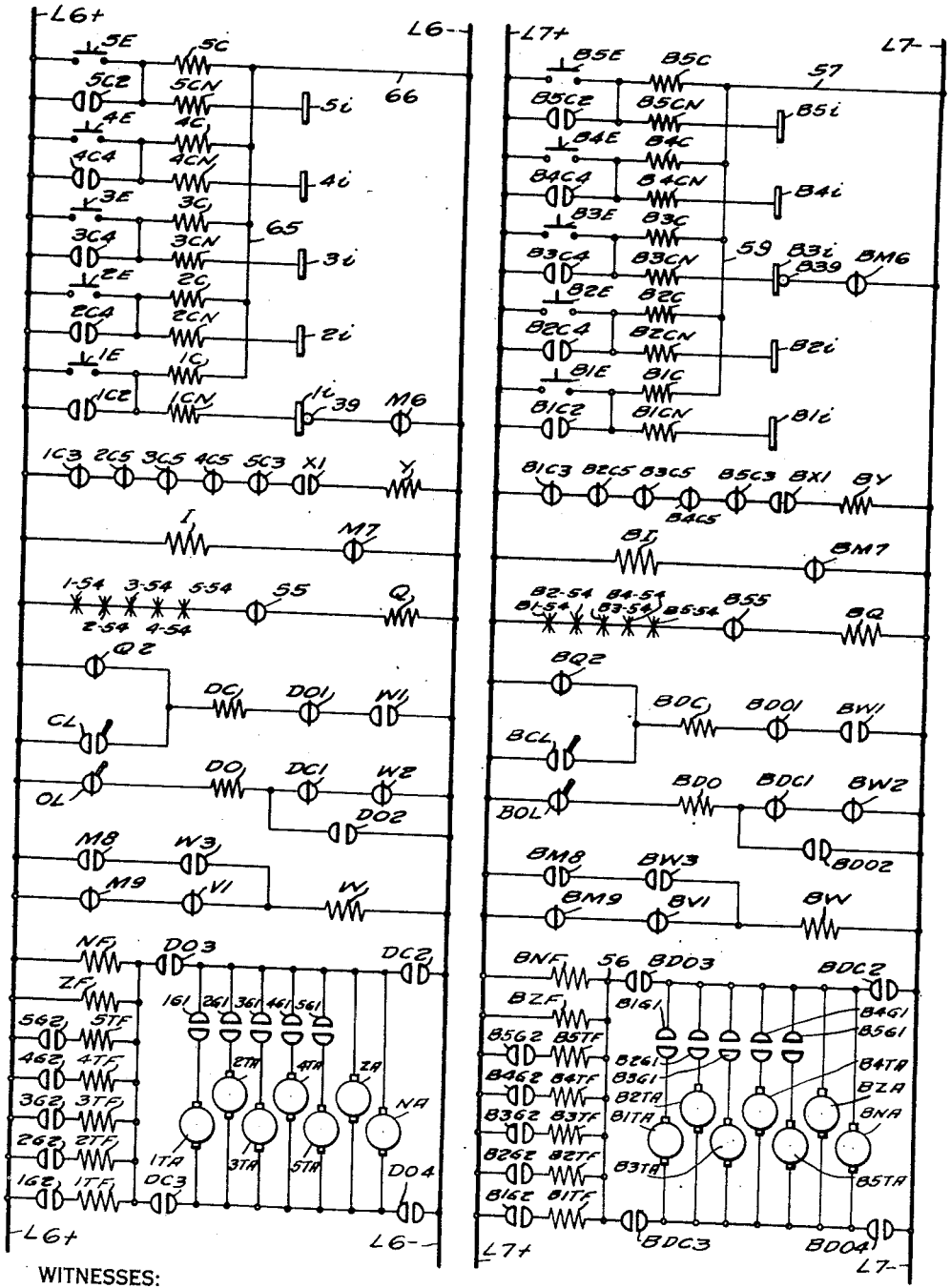
Figure 5:
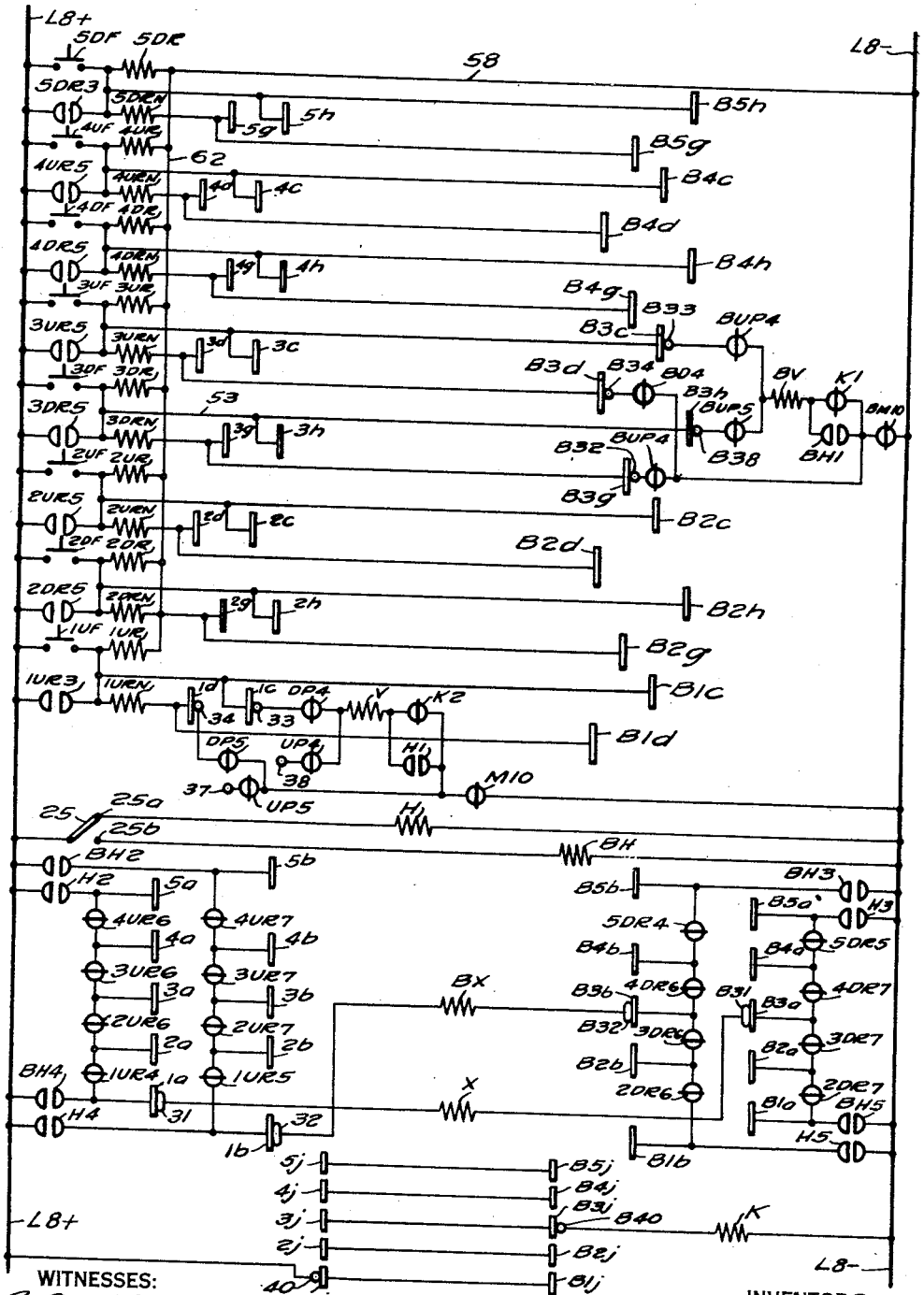

For a better understanding of the invention, reference may be had to the accompanying drawings, in which Figure 1 is a diagrammatic representation of an elevator system embodying our invention, Fig. 2 is a diagrammatic representation of the contact segments and contact brushes of the floor selector used on each of the cars, Figs. 3, 4 and 5 collectively constitute a "straight line" diagrammatic representation of the control circuits for the elevator system illustrated in Fig. 1, and Figs. 3A, 4A and 5A are key illustrations of the relays embodied in Figs. 3, 4 and 5.

For convenience in reading the drawings, Fig. 3A should be placed beside Fig. 3; Fig. 4A should be placed under Fig. 3A and beside Fig. 4; and Fig. 5A should be placed under Fig. 4A and beside Fig. 5.

Figure 5A:
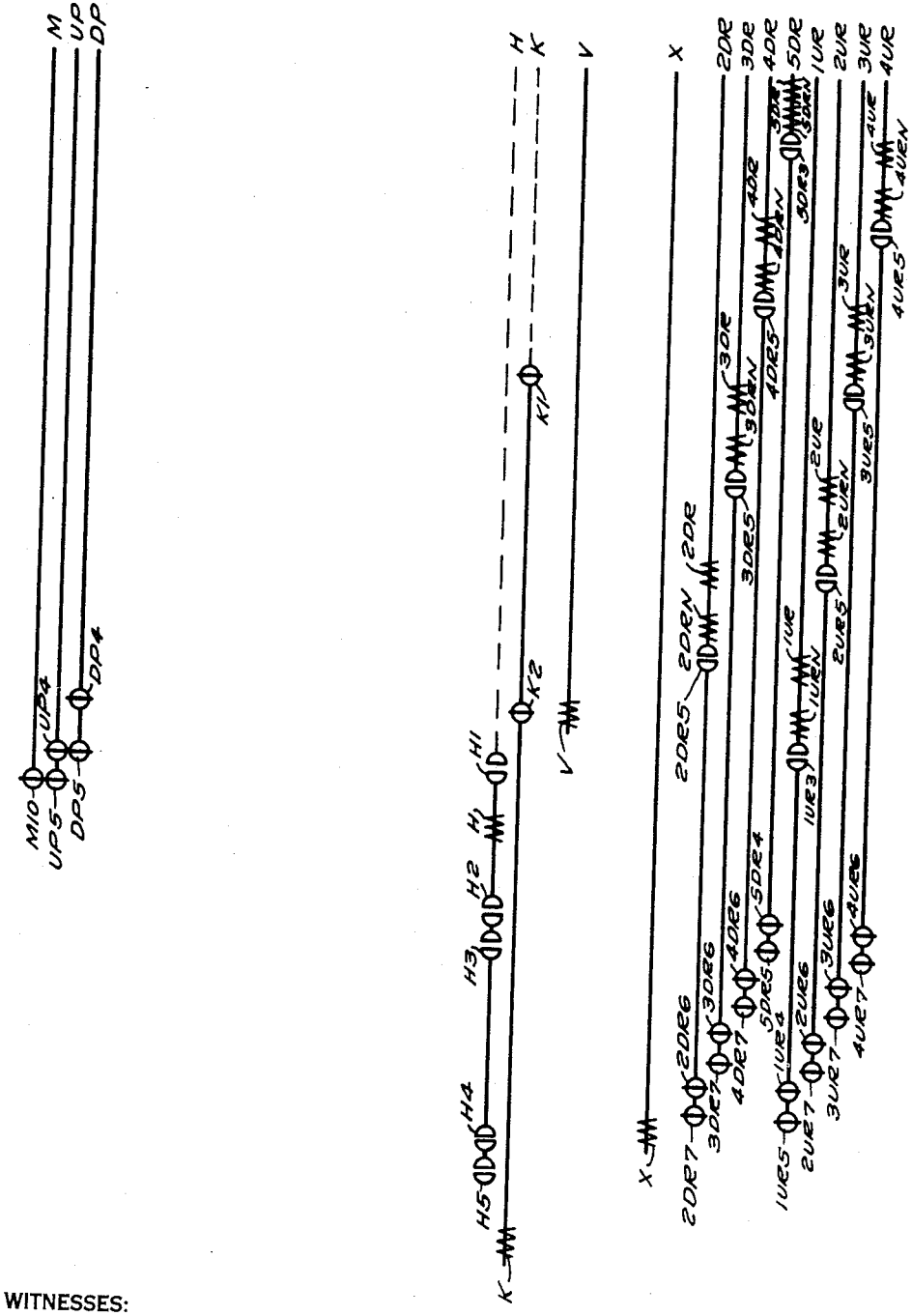

The illustration of the relays in Figs. 3A, 4A and 5A shows them with their coils and contact members disposed in horizontal alignment with their positions in the straight line circuits of Figs. 3, 4 and 5 so that the position of the coil and the contact members of any relay in the straight line circuit may be readily located. The following is a general list of the relays etc. in the control circuit.

*Relays, etc., individual to car A*

| | |
|---|---|
| U | =Up direction switch. |
| D | =Down direction switch. |
| M | =Control conditioning relay. |
| UP | =Up direction preference relay. |
| DP | =Down direction preference relay. |
| TE | =Car hesitating relay. |
| US | =Up stopping relays. |
| DS | =Down stopping relays. |
| E | =Call buttons in car. |
| C | =Car button holding coils. |
| CN | =Car button cancellation coils. |
| I | =Inductor relay on car. |
| H | =Car selecting relay. |
| X | =Car preference relay. |
| Y | =Auxiliary car preference relay. |
| Q | =Gate and door interlock relay. |
| V | =Auxiliary door relay responsive to hall button at floor where car is located. |
| N | =Door control motor. |
| T | =Hatch door motor. |
| Z | =Car gate motor. |
| DC | =Door closing relay. |
| DO | =Door opening relay. |
| W | =Door control relay. |

*Relays common to all cars*

| | |
|---|---|
| UF | =Up call buttons at floors. |
| DF | =Down call buttons at floors. |
| UR | =Up direction floor call registering relays. |
| DR | =Down direction floor registering relays. |
| DRN | =Cancellation coils on down call registering relays. |
| URN | =Cancellation coils on up call registering relays. |
| K | =Door selecting relay. |

Referring more particularly to the drawings, we have illustrated an elevator system as comprising two cars A and B, although it is to be understood that the invention may be applied to a system including any desirable number of cars. The car A is supported in a hatchway 10 by a cable 11 passing over a hoisting drum 12 to a suitable counterweight 13 for serving five floors but the system may be adapted to any desired number of floors. The hoisting drum is mounted upon a shaft 14 disposed to be driven by an electric motor 15. A brake 17 is provided for controlling the car when it makes a stop. The brake is of the electromagnetic type in which a coil 18 may be energized to free the brake. The hatchway 10 is provided with a door 16 at each floor and the car is provided with a car gate 19.

Any suitable motor may be used for operating the hoisting drum. In this case, it is illustrated as a three-phase alternating current motor comprising a rotor 20 and a plurality of stator windings 21, 22 and 23.

The direction of operation of the motor is controlled by an up direction switch or relay U and a down direction switch or relay D which connect the motor to a source of electric energy represented by conductors L1, L2 and L3 for operating the car in either the up direction or the down direction. These direction switches are controlled by a plurality of push buttons operated by the passenger. When a passenger at a floor desires a car for travel to another floor in either direction, he operates a call or control device such as a push button at his floor landing for the desired direction. If no car is at that floor, a car moves to that floor, stops thereat and opens its doors and then the passenger enters the car and pushes a button in the car for the floor to which he desires to go. The push buttons at the floor landings, one for each direction, are common to all the cars in this system. The push buttons in each car are, of course, individual to that car.

The car buttons in car A are designated as 1E, 2E, 3E, 4E and 5E, and they serve for operation in either direction. Each car button is provided with a relay having a holding coil and a cancellation coil. The holding coil maintains the relay in its energized position after a passenger presses the button until the cancellation coil is energized to effect the release of the relay to cancel the call. Therefore, it is not necessary for a passenger to continuously hold the car button in position but press it temporarily to cause the car to go to the floor to which he desires to proceed. The holding coils are designated as 1C, 2C, 3C, 4C and 5C and the cancellation coils as 1CN, 2CN, 3CN, 4CN and 5CN.

The call push buttons at the floors are designated as 1UF, 2UF, 3UF and 4UF for the up direction and as 5DF, 4DF, 3DF and 2DF for the down direction.

A plurality of call registering relays are provided so that the pressing of a push button at any floor will effect the registration of a call for a car at that floor. The call registering relays for the up direction are designated as 1UR, 2UR, 3UR and 4UR while the call registering relays for the down direction are designated as 5DR, 4DR, 3DR and 2DR. Each registering relay is provided with self-holding contact members and a cancellation coil so that the temporary pressing of a button at a floor will cause registration of a call until the cancellation coil is energized to restore the registering relay to its normal condition. The up cancellation coils are designated as 1URN, 2URN, 3URN and 4URN and the down cancellation coils are designated as 5DRN, 4DRN, 3DRN and 2DRN.

A plurality of stopping relays are provided for each car for effecting the stopping of that car at a floor when it completes its travel in response to the operation of either a floor button or a car button. The stopping relays for the up direction are designated as 1US, for the first floor, 2US for the second floor, 3US for the third floor, 4US for the fourth floor and 5US for the fifth floor. The down stopping relays for car A are designated as 5DS, 4DS, 3DS, 2DS and 1DS, respectively.

A pair of direction preference relays are provided for each car for cooperation with the call registering relays and the stopping relays in causing the car to answer registered calls in the correct direction. The up preference relay is designated as UP and the down preference relay as DP for car A.

In this system it is desirable to prevent a car from restarting immediately after it arrives at and stops at a floor at which a passenger is waiting to give the passenger time to open the door and enter the car before it restarts. Therefore, a hesitating or car holding relay is provided for each car for preventing that car from restarting until after the expiration of a predetermined time after it stops at a floor, thus giving the passenger time in which to open the door. The opening of the door effects the opening of door safety contact members associated therewith and thereby prevents further movement of the car until the door is again closed. Each of these hesitating relays should be provided with a time element which permits it to open its contact members rapidly, when energized, but causes it to delay closing its contact members for a predetermined time after it is deenergized. The hesitating relay for car A is designated at TE and its time element dashpot as 41.

A control conditioning relay M is provided for connecting certain circuits when the car is running and disconnecting them when the car stops and for disconnecting other circuits when the car runs and connecting them when the car stops. This relay also controls the energization of the brake 17. The contact members M9 on the relay M are provided with a dashpot to prevent them from opening until after the expiration of a predetermined time after the relay is energized, for a purpose to be described later.

In the operation of this system, it is desirable to provide a means whereby the superintendent or dispatcher of a building may select any one of the cars to be the first to answer a call when the cars are parked at one floor and waiting for calls. A switch 25, disposed to control a plurality of car selecting relays, is provided for this purpose. The car selecting relay for car A is designated as H and that for car B as BH. When the switch is moved to engage its contact members 25a, the selecting relay H for car A is energized and, with both cars parked at a floor and a call entered, car A will be the first to respond. If the switch is moved from contact member 25a to contact member 25b, the car B will be the first to respond after a call is registered while both cars are parked at a floor.

In order to assist the operation of the car selecting relays, each car is provided with a car preference relay, that for car A being designated as X and the one for car B being designated as BX. These relays are controlled by the position of the cars and also by the condition of the car selecting relays.

Each car is provided with an auxiliary car preference relay, that for car A being designated as Y and the one for car B as BY. The auxiliary relays Y and BY operate in response to operation of the car preference relays and the car buttons to control the energizing of the up and down direction switches in starting the selected car.

The hatchway is providing with a suitable hatchway door 16 at each floor for each car and each car is also provided with a suitable car gate 19 for the safety of the passengers. When the car stops at a floor, the gate and door automatically open, stay open a predetermined time and then automatically close. After the gate and door close, if a passenger appears and pushes the call button at that floor, the gate and door automatically reopen.

Each car is provided with a door and gate interlock relay which is energized only when all the hatchway doors for a car and the gate on that car are closed, and is thereby caused to so operate its contact members as to prevent movement of the car when the doors and gate are not closed. The interlock relay for car A is designated as Q. The car door 19 is provided with safety contact members 55 and the associated hatchway doors with contact members 1—54 to 5—54. The closing of the doors closes these contact members, thereby energizing the relay Q to permit operation of the car.

The hatchway doors for each car and the car gate for that car are provided with individual power means such as driving motors controlled by the operation of a control motor. The motor for the hatchway door at the first floor for car A is designated as 1T, the car gate motor for car A as Z and the control motor as N. The hatch door motors and the car gate motors are disposed adjacent to the doors and gates they operate. The control motor may be disposed in any suitable location, for instance in the pent house, and is connected to control the acceleration and deceleration of the gate and door motors. The control motor also operates the opening limit switch OL and the closing limit switch CL in the circuits of the door opening relay and the door closing relay.

The hatchway door motor 1T for car A at the first floor is provided with an armature 1TA and a field winding 1TF. The hatchway door motors for car A at the other floors have their armatures and field windings designated in the same manner with the prefix numeral changed to indicate the floor. The car gate motor Z for car A is provided with an armature ZA and a field winding ZF. The control motor for car A is provided with an armature NA and a field winding NF. When a car makes a stop at a floor, the car gate motor, the hatchway door motor for that car at that floor and the door control motor for that car are energized to effect the opening of the car gate and hatchway door. As indicated in Fig. 4, the car gate motor, the hatch door motor and the control motor are so connected that their field windings are in parallel with each other, their armatures are in parallel with each other and the parallel armatures are in series with the parallel fields. A similar system of individual door, gate and control motors is described in the Harold V. McCormick Patent No. 1,906,703, issued May 2, 1933, and for greater details of such a system, reference may be had to that patent.

In order that the hatchway door motor for a hatchway door at a floor at which a car is stopped may be prepared for operation in cooperation with the car gate motor and the control motor at the time a stop is made, each car is provided with an inductor relay which may be energized to close its switch for the hatchway door motor where the car stops at the time the car stops. The inductor relay for car A is designated as I and should be mounted on the car in position to effect the closing of a switch when the car stops at a floor. The hatchway door motor switch at the first floor for car A is designated as 1G and its contact members as 1G1 and 1G2. A similar switch is disposed at each of the hatchway doors for the other hatchway door motors and are similarly designated in accordance with their position and the car they serve.

The doors and car gate for car A are controlled by a door control relay W which, in turn, controls a door closing relay DC and a door opening relay DO, and these relays are so connected to the control system that the operation of the doors will be automatic in response to the stopping and the starting of the car. When the hatchway door and the car gate open, it is desirable to have them remain open for a predetermined time before starting to reclose to give the passengers time to enter or leave the car before the door and gate start to close. This is effected by providing a time delay element or dashpot 42 for the contact members DO1 of the door opening relay DO and also a dashpot 61 for the time delay contact members M9 on the conditioning relay M, which were previously described, so that the door closing relay cannot be energized to close the door and gate until the expiration of a predetermined time after the door and gate open.

An auxiliary door relay is provided for each car so that if a car is parked with its door closed at a floor and the push button at that floor is pressed by a passenger, that pressing of the button will cause that parked car to reopen its door to permit the passenger to enter. The auxiliary door relay for car A is designated as V.

In addition to the car selecting relays H, the system is provided with a door selecting relay K for selecting the door which will be reopened when several cars are parked at a floor with their doors closed and the push button at that floor is pressed. This relay K is controlled by the position of the cars.

A floor selector FS is provided for each car for connecting the various circuits for the relays, push buttons, etc., in accordance with the position of the car with reference to the floors it serves, and with reference to each other.

The floor selector for car A is designated as FS and comprises (as indicated in Fig. 2) the plurality of stationary contact members disposed in positions corresponding to the various floors at a plurality of cooperating contact brushes.

Although any suitable floor selector may be used, we prefer a floor selector of the type illustrated in Fig. 2, the brush arm 46 of which may be operated by a screw-threaded shaft 47, operated by some part of the elevator motive means in such a manner that it will move the brush arm bearing the contact brushes over the contact segments in accordance with the movement of the car up and down its hatchway, but it is to be understood that any suitable floor selector which will connect the circuits in the manner desired may be embodied in the system.

The floor selector shown in Fig. 2 comprises a plurality of contact segments 1a, 2a, 3a, 4a and 5a, disposed to be engaged in sequence in accordance with the movement of the car A by a contact brush 31 for operating the car preference relay X.

A plurality of contact segments designated as 1b, 2b, 3b, 4b and 5b are disposed to be engaged by brush 32 for connecting the circuits of car A with the car preference relay BX of car B. A plurality of contact segments 1c, 2c, 3c and 4c are disposed to be engaged by brush 33 for connecting the up haul call registering relays UR in the system in accordance with the position of the car. A plurality of contact members 1d, 2d, 3d and 4d are disposed to be engaged by a brush 34 for connecting the up cancellation coils URN associated with the up call registering relays in accordance with the position of the car. A plurality of contact segments 1e, 2e, 3e, 4e and 5e are disposed to be engaged by a brush 35 for connecting the stopping relays US in accordance with the position of the car. A plurality of contact segments 1f, 2f, 3f, 4f and 5f are disposed to be engaged by a brush 36 for connecting the down stopping relays DS. A plurality of contact segments 2g, 3g, 4g and 5g are disposed to be engaged by a brush 37 for connecting the down cancellation coils associated with the down floor call registering relays. A plurality of contact segments 2h, 3h, 4h and 5h are disposed to be engaged by a brush 38 for connecting the down floor call registering relays. A plurality of contact segments 1i, 2i, 3i, 4i and 5i are disposed to be engaged by a brush 39 for connecting the cancellation coils CN on the car buttons of car A. A plurality of contact segments 1j, 2j, 3j, 4j and 5j are disposed to be engaged by a brush 40 for connecting the door selecting relay K for operation.

Inasmuch as the apparatus and relays have now been described, it is believed that the invention may be more readily understood by an assumed operation of the system showing how the various relays and pieces of apparatus cooperate to produce the desired result.

It will be assumed that car A is standing at the first floor, that car B is standing at the third floor and that the line switches 50 and 51 are closed to connect the circuits for the cars A and B to their supply circuit represented by the conductors L1, L2 and L3. Under these circumstances, the stopping relays 1US and 1DS, the inductor relay I, the gate and door interlock relay Q, the door control relay W, the car selecting relay H, the car preference relay X and the auxiliary car preference relay Y for car A are energized and the similar relays for car B are also energized to prepare the system for operation.

It will also be assumed that the superintendent in charge of the cars has placed the switch 25 upon the contact members 25a, thereby energizing the car selecting relay H to cause car A to be the selected car which will respond to a registered call at a floor when both cars are parked at one floor. The energized relay H closes its contact members H1, H2, H3, H4 and H5, thereby effecting the energization of the car preference relays X for car A and BX for car B.

It will be assumed now that the down floor button 3DF at the third floor is pressed momentarily by a passenger at that floor who desires to travel downwardly. While the button 3DF is pressed it closes a circuit for the call registering relay 3DR, but it also energizes the cancellation coil 3DRN because car B is standing at the third floor with its brush B32 on the contact segment B3g. Hence the coil 3DRN neutralizes the coil 3DR and no call is registered. However, inasmuch as the car B is standing at the third floor, the momentary pressing of the button 3DF causes energization of the auxiliary door relay BV of car B to effect the opening of the hatchway door and the car gate of that car. The circuit for relay BV extends from the supply conductor L8+, through the contact members of button 3DF, through conductor 53, contact segment B3h, brush B36, contact members BUP5, the coil of relay BV, the contact members K1 and BM10, to the supply conductor L8—. The energized relay BV opens its contact members BV1 in the circuit of the door control relay BW, thereby deenergizing that relay which thereupon closes its contact members BW2, in the circuit of the door opening relay BDO for car B, thereby energizing that relay, through a circuit extending from the supply conductor L7+, through the door opening limit switch BOL, coil BDO, contact members BDC1, and BW2 to the supply conductor L7—. The energized relay BDO closes its self-holding contact members BDO2, so that it stays energized after the button 3DF is released. At the same time it opens its contact members BDO1, thus deenergizing the door closing relay BDC.

Inasmuch as car B is standing at the third floor, its inductor relay BI is energized, thus closing the contact members B3G1 and B3G2 in the field winding and armature circuits of the hatchway door motor for the third floor. With the contact members of this switch closed, the closing of the contact members BDO3 and BDO4 energize the motor for the hatchway door of car B at the third floor, the car gate motor for car B, and the door control motor for car B. The circuits extend from the supply conductor L7+, in parallel, through the field windings BNF, BZF and B3TF to a junction point 56 and thence in parallel through the armatures B3TA, BZA and BNA to the conductor L7—. Hence the control motor, the car gate motor and the hatch door motor for car B at the third floor are now energized to operate simultaneously to open the hatch door and the car gate for car B at the third floor and the gate and door start to open.

As the car gate and hatchway door reach their open position, the car gate limit switch BOL is operated by the control motor to open its contact members and thereby deenergize the door opening relay DO. The gate and door are now open, and the waiting passenger enters the car. It will be recalled that the opening relay DO has a time limit device which causes it to move slowly when it is deenergized.

After the expiration of a predetermined time the relay DO closes its contact members BDO1 and thereby effects the energization of the door closing relay BDC.

The energized relay BDC closes its contact members BDC2 and BDC3 thereby energizing the armature BZA and the field winding BZF of the car gate motor, the armature B3TA and the field winding B3TF of the hatchway door motor, and also the armature BNA and the field winding BNF of the control motor to cause these motors to operate in their closing direction to effect the closing of the car gate and the hatchway door.

The closing of the door and gate causes the door contact members B3—54 and the gate contact members B55 to close, thereby energizing the gate and door interlock relay BQ, which closes its contact members BQ1 in the circuit for the direction switches to prepare those switches for operation. As the gate and door reach their closed position, the limit switch BCL is opened, thereby deenergizing the door closing relay BDC, which opens its contact members BDC2 and BDC3, thus deenergizing the closing operation of the door motor, the gate motor and the control motor.

By the foregoing assumed operation, it is seen that, with a car standing alone at a floor with its gate and door closed, the operation of the call button at that floor will cause the gate and door of that car to reopen.

It will be assumed now that the passenger in the car presses the car button B1E to cause the car to start travelling down to and stop at the first floor. The pressing of the button B1E energizes the car button coil B1C by a circuit extending from the supply conductor L7+ through button B1E, coil B1C and conductors 59 and 57 to supply conductor L7−. The energized relay B1C opens its contact members B1C3 thereby deenergizing the relay BY to also prepare a circuit for energizing one of the direction switches. The energized relay B1C also closes its contact members B1C1 for energizing the down direction preference relay BDP for car B by a circuit extending from the supply conductor L5+ through contact members B1C1, B1DS1, BUP3 and coil BDP to the supply conductor L5−, which in turn opens its contact members BDP1, to deenergize the up stopping relay B3US.

The energized relay BDP closes its contact members BDP2 thereby energizing the down direction switch BD by a circuit extending from the supply conductor L5+ through contact members 2DR2, B2C1, 3DR2, B3C1, 4DR2, B4C1, BDP2, coil BD, contact members BU4, coil BM and contact members BQ1, BY1 and BTE1, to the supply conductor L5−. The energized down direction switch BD and the down control conditioning relay BM causes car B to move down to the first floor where it will be stopped by the stopping relay B1DS at the end of its run.

The energized conditioning relay BM opens its contact members BM7, thereby deenergizing the inductor relay B1 of car B (Fig. 4) so that the car can pass other floors without closing the hatchway door motor circuits at such floors. The energized relay BM also closes its contact members BM5 (bottom of Fig. 3) to energize the car hesitating relay BTE to open its contact members BTE1 so that on its next stop the car cannot be restarted until after the expiration of the predetermined time for which the time delay contact members BTE1 are set to close after deenergization of the relay BTE. The energized relay BM also closes its contact members BM3 (Fig. 3) thereby energizing the brake coil B18 to release the brake B17 to permit the car to operate downwardly. The energized relay BM also closes its contact members BM1 and BM2 to prepare the circuit for energizing the hoisting motor B15 to move car B downwardly.

The energized down direction switch BD closes its contact members BD1 and BD2, thereby energizing the motor B15 which starts to move the car downwardly. This switch also closes its self-holding contact members BD3 to provide a circuit around the now open contact members BTE1.

The car B now starts downwardly from the third floor and, in so doing, moves the brush B36 on its floor selector from the contact segment B3f to the contact segment B2f, thereby deenergizing the stopping relay B3DS and energizing the down stopping relay B2DS. However, this has no effect upon the car as none of its cooperating stopping circuits are prepared for operation by it. As the car continues down to the first floor it moves the brush B36 from the contact segment B2f to the contact segment B1f, thereby deenergizing the down stopping relay B2DS and energizing the down stopping relay B1DS, the circuit for B1DS extending from the supply conductor L5+ through relay B1DS, contact segment B1f, brush B36, contact members BUP1 to supply conductor L5+.

The energized relay B1DS opens its contact members B1DS1 thereby deenergizing the down direction preference relay BDP to effect the stopping of the car at the first floor.

The deenergized down direction preference relay BDP closes its contact members BDP1 to energize the up direction stopping relay B1US and opens its contact members BDP2 to deenergize the down direction switch BD and the control conditioning relay BM for car B. The deenergized relay BD opens its contact members BD1 and BD2 (Fig. 3), thereby deenergizing and stopping the hoisting motor B15 and at the same time the deenergized relay BM opens its contact members BM3 thereby applying the brake B17 to stop the car. This relay also opens its contact members BM5 to deenergize the time element relay BTE for the purpose of starting the time delay so that the car cannot restart immediately.

The car is now stopped at the first floor and the car gate and the hatchway door are automatically opened as follows:

The deenergized relay BM also closes its contact members BM7 thereby energizing the inductor relay B1 to operate the door motor switch B1G for car B at the first floor to close its contact members B1G1 and B1G2 for preparing the circuits for operation of the hatchway door at the first floor. The deenergized relay BM also opens its contact members BM3 in the circuit of the door control motor BW thereby deenergizing that relay. The deenergized relay BW opens its contact members BW1 and closes its contact members BW2. The closing of contact members BW2 energizes the door opening relay BDO, which thereupon closes its contact members BDO3 and BDO4, thereby energizing the car gate motor and the hatchway door motor and the control motor to effect the opening operation of the hatchway door for car B at the first floor and also the car gate of car B.

As the gate and door for car B reach their open position, the limit switch BOL is operated by the control motor to deenergize the door opening relay BDO, but because of the time element on its contact members BDO4 those contact members do not close immediately. Thus they delay for a predetermined time the energization of the door closing relay to close the door. It is during this period of delay that the passenger may leave the car.

When the relay BM was deenergized it also closed its contact members BM9, but these contact members are provided with a time delay such as the dashpot 61 which causes them to open and to close slowly. Hence the contact members BM9 do not close until the relay BW is deenergized long enough to permit energization of the opening relay BDO and the establishment of a self-holding circuit therefor through the closing of its contact members BDO2. As soon as the contact members BM9 close, the relay BW is again energized to close its contact members BW1 so that the door may be closed and the next cycle of door operation may be carried out.

As the car moved into the first floor, the brush B40 engaged the contact segment B1j on its floor selector (Fig. 5) thereby energizing the door selecting relay K by a circuit extending from the supply conductor L8+ through brush 40, contact segments 1j and B1j, brush B40, and coil K to the supply conductor L8—. This energized relay K so conditions the system that it will automatically select the door which will be opened first upon receipt of a call for service from another floor while both cars are stationed at the first floor.

The movement of the car into the first floor also causes the brush B39 to engage the contact segment B1i, thereby energizing the cancellation coil B1CN by reason of the closed contact members B1C2. The energizing coil B1CN neutralizes the energized coil B1C and thereby causes that relay to open its contact members B1C2. This cancels the call on the car button B1E in car B for the first floor.

The car gate and the hatchway door are now open and it will be assumed that the passenger leaves the car at the first floor, that no other passenger is waiting for the car, and that, after the expiration of the predetermined time, the deenergized door opening relay closes its time delay contact members BDO1, thereby energizing the door closing relay BDC to effect the closing of the car gate and the hatchway door. The energized door closing relay BDC closes its contact members BDC2 and BDC3, thereby energizing the gate motor, the door motor and the control motor in the reverse direction for closing the car gate and the car door at the first floor for car B. As the door and gate reach their closed positions, the limit switch CL is moved by the control motor to its open position and thereby deenergizes the door closing relay BDC, which, in turn, opens its contact members BDC2 and BDC3, thus deenergizing the gate motor BZ, the door motor B1T and the control motor BN. Also, when the door and gate close they close their safety contact members B1—54 and B55, thereby energizing the gate and door interlock relay BQ to permit operation of car B when the control system is energized.

Both cars are now at the first floor with their doors closed, and the car selecting relay H is energized to cause car A to be the first car to answer a call from another floor if such a call is received while both cars remain at the first floor. The door selecting relay K is also energized by the position of both cars at the first floor to cause the car gate and hatchway door for car A to be the first to open if a passenger at the first floor pushes the floor button to gain access to a car.

It will be assumed that a passenger appears at the first floor landing and presses the floor button 1UF to gain access to one of the cars. This causes the gate and door for car A to open. This is effected because operation of the floor button 1UF energizes the auxiliary door relay V of car A (Fig. 5) by a circuit extending from the supply conductor L8+ through button 1UF, contact segment 1c, brush 33, contact members DP4, coil V, and contact members H1 and M10 to the supply conductor L8—. It may be noted that this relay V is energized because the door selecting relay K has its contact members K1 and K2 open while the contact members H1 are closed and the contact members BH1 are open in the circuit for the relay BV.

The energized relay V opens its contact members V1 thereby deenergizing the door control relay W for car A, which in turn closes its contact members W2, thereby energizing the door opening relay DO of car A. The energized relay DO closes its contact members DO3 and DO4, thereby energizing the armature 1TA and the field winding 1TF of the hatchdoor motor 1T, the armature ZA and the field winding ZF of the car gate motor Z, and the armature NA and the field winding NF of the door control motor N for car A. These motors move the door and gate to open position and as they reach their full open position the control motor opens the limit switch OL, thereby deenergizing the door opening relay DO to stop the gate and door opening motors by opening its contact members DO3 and DO4.

It will be assumed that the waiting passenger releases the button 1UF as the door and gate of car A are now open. The releasing of the button 1UF deenergizes the relay V, which in turn closes its contact members V1 to again energize the door control relay W.

Upon the expiration of the time delay for the door opening relay contact members DO1, those contact members close and thereby energize the door closing relay DC to close its contact members DC2 and DC3 for energizing the motors Z, T and N to effect the closing of the car gate and the hatchway door for car A at the first floor. As the door and gate near their closed position, the control motor N opens the limit switch CL to deenergize the relay DC to stop the motors Z, T and N. The closing of the door and gate also closes their safety contact members 1—54 and 55 for energizing the door and gate interlock relay Q. Both cars now have their gates and doors closed and are still parked at the first floor.

The operation of the gate and door opening for the preferred car in response to the pressing of the button 1UF has been given to illustrate how the system will operate when two cars are standing at any floor with their doors and gates closed and a waiting passenger at that floor presses the hall button at that floor.

This same action would have occurred had the two cars been standing at the third floor or any other floor and, in the previous example where car B opened its doors in response to the third floor down button, car A would have opened its doors had both cars been parked there.

It will be assumed now that the passenger changed his mind and did not enter the car but that a waiting passenger at the fourth floor, desirous of travelling downwardly, presses the down hall button 4DF to register a call to bring a car to him at that floor. This causes car A to leave the first floor, run up to a stop at the fourth floor and automaticaly open its car gate and hatchway door at that floor. This is effected as follows:

The pressing of the button 4DF energizes the coil 4DR to register the call by a circuit extending from the supply conductor L8+ through button 4DF, coil 4DR, conductors 62 and 58 to the supply conductor L8—. The energized relay 4DR closes its contact members 4DR5 to provide a self-holding circuit for itself, it opens its contact members 4DR6 (Fig. 5) to effect deenergization of the car preference relay X so that car preference will cease, and closes its contact members 4DR3 (Fig. 3) for energizing the up preference relay UP of car A (the preferred car) to cause it to move upwardly to the fourth floor. It is this action of the contact members 4DR6 opening to deenergize the relay X which causes car A to respond to the call.

The deenergized relay X opens its contact members X1 and thereby deenergizes the auxiliary car preference relay Y so that there will be no preference for the cars after car A leaves the first floor, except such preference as comes from a call being registered ahead of the car. The deenergization of the relay Y closes its back contact members Y1 thus preparing a circuit for energizing the up direction switch of car A to move it upwardly. The relays BX and BY for car B are still energized and holding their contact members BX1 and BY1 open so that the direction switch for car B cannot be energized.

Returning now to the energized up direction preference relay UP, it closes its contact members UP2, thereby energizing the up direction switch U and the relay M for car A, the circuit extending from the supply conductor L4+, through contact members 2UR1, 2C2, 3UR1, 3C2, 4US1, UP2, coil U, contact members D4, coil M, and contact members Q1, Y1 and TE1, to the supply circuit L4—.

The energization of the up direction switch U and the conditioning relay M starts the car upwardly to answer the call at the fourth floor. This is effected by the closing of the contact members M3 energizing the brake coil 18 to release the brake 17, the closing of the contact members M1 and M2 preparing the circuits for connecting the hoisting motor to the main line, the closing of the contact members M4 energizing the hesitating relay TE so that its time delay contact members will close slowly at the next stop and thereby prevent immediate restarting, the opening of the contact members M7 deenergizing the inductor relay I, and the energized relay U closing its contact member U1 and U2 thereby energizing the hoisting motor 15 to operate the car in the up direction.

The car is now moving upwardly, and in so doing causes its floor selector to move its brush 35 upwardly over the contact segments for the stopping relays. When the relay UP was energized, it opened its contact members UP1, thereby deenergizing the down direction stopping relay 1DS, and as the car moves upwardly the brush 35 leaves the contact segment 1e and engages the contact segment 2e, thereby deenergizing the up direction stopping relay 1US and energizing the stopping relay 2US. Also, the upward movement of the car from the first floor causes the brush 40 to leave the contact segment 1j, thereby opening the circuit for the relay K and deenergizing that relay, so that the door selector relay will not operate until both cars are again standing at the same floor.

As the car continues its upward movement, its floor selector brush 35 leaves the contact segment 2e and engages the contact segment 3e thereby deenergizing the up stopping relay 2US and energizing the up stopping relay 3US. Continuing upwardly, the car causes the brush 35 to leave the contact segment 3e and engage the contact segment 4e, thereby deenergizing the relay 3US and energizing the relay 4US. This effects the stopping of the car at the fourth floor in answer to the registered call, because the energized relay 4US opens its contact members 4US2 in the sequence circuit 60 (Fig. 3), which was energized by the closed contact members 4DR3, thus deenergizing the up direction preference relay UP, which, in turn, opens its contact members UP2, thereby deenergizing the up direction switch U and the conditioning relay M to stop the car. The deenergized relay UP also closes its contact members DP1 thereby energizing the down direction stopping relay 4DS.

The deenergization of the up switch U opens its contact members U1 and U2, to stop the motor 15 and the deenergized relay M opens its contact members M3, thus deenergizing the brake coil 18 and applying the brake 17 to stop the car.

The deenergized relay M also closes its contact members M5, thus deenergizing the hesitating relay TE and starting its time delay to prevent the car from being restarted for a predetermined time. The relay M also closes its contact members M6 thus completing a circuit (Fig. 4) for energizing the cancellation coil 4CN to cancel the registered call at the fourth floor and closes its contact members M7 to energize the inductor relay for preparing the circuits for energizing the hatchway door motor for car A at the fourth floor. The car is now stopped at the fourth floor and the automatic opening of its gate and door are effected as follows:

The deenergized relay M opens its contact members M8 which deenergizes the door control relay W and the deenergized relay W closes its contact members W2 thereby energizing the door opening relay DO which, in turn, closes its contact members DO3 and DO4 for energizing the armature 4TA and the field winding 4TF of the hatchway door motor, the armature NA and the field winding NF of the door control motor, and the armature ZA and the field winding ZF of the car gate motor, the circuits for the door motor having been prepared by the inductor relay I closing the switch contact members 4G2 and 4G1. Thus the door and gate motors are now energized and hence move the door for car A at the fourth floor and the car gate for car A to their open position. As the door and gate start to open, they open their safety contact members 4—54 and 55, thereby deenergizing the gate interlock relay Q to prevent starting of the car while the door or gate is open.

As the door and gate reach their open position, the limit switch OL is operated by the control motor N to deenergize the door opening relay DO which, in turn, opens its contact members DO3 and DO4, thus deenergizing the door motor, the car gate motor, and the control motor to stop the door and the gate in their full open position. The waiting passenger at the fourth floor can now enter the car.

It should be noted that when car A arrived at the fourth floor, the brush 34 engaged the contact segment 4d on its floor selector and thereby energized the call cancelling coil 4URN to cancel the call registered at the fourth floor by deenergizing the coil 4DR.

It will be assumed that the waiting passenger at the fourth floor enters the car and presses the car button 2E so that the car will take him down to the second floor. This operation of the button 2E will cause the car to start, run down, stop at the second floor, and its door and gate to automatically open at that floor. This operation is effected as follows: The pressing of the button 2E closes its contact members thereby energizing the holding coil 2C (Fig. 4) by a circuit extending from the supply conductor L6+ through 2E, 2C, 65 and 66 to supply conductor L6—. The energization of the coil 2C opens its contact members 2C5 thereby deenergizing the auxiliary car preference relay Y (Fig. 4) which, in turn, closes its back contact members Y1 to prepare the control circuit of car A for operation (Fig. 3). The energization of the coil 2C also closes its contact members 2C3 thereby energizing the sequence conductor 60 to energize the down preference relay DP to close its contact members DP2 for down operation of the car.

At this point, after the passenger is in the car and the car button 2E has been pressed, the predetermined time element contact members DO1 on the door closing relay DO close, thereby energizing the door closing relay DC by a circuit extending through L6+, Q2, DC, DO1, W1 to L6—. The energized relay DO closes its contact members DO3 and DO4 thereby energizing the door motor, the gate motor and the control motor for car A at the fourth floor to effect the closing of the door and the gate for that car at that floor.

The door and gate for that car now move to their closed position and the control motor operates to open the limit switch CL to stop the car motor, the gate motor and the control motor when the door and gate are in their full closed position.

As the door and gate arrive at their full closed position, they close the door and gate contact members 4—54 and 55 thereby energizing the gate interlock relay Q which thereupon closes its contact members Q1 thus completing the circuit for energizing the down direction switch D and the conditioning relay M. Inasmuch as the energized relay 2C also opened its contact members 2C1 in one of the parallel circuits for the down direction switch D, the circuit for that energized switch (completed by the closing contact members Q1) now extends from the supply conductor L4+ through 2DS1, 3DR1, 3C1, 4DR1, 4C1, DP2, D, U4, M, Q1, Y1, TE1, to L4—.

The energized conditioning relay M closes its contact members M4 and also its contact members M5 thereby energizing the hesitating relay to open its contact members TE1 so that the car cannot be started immediately after its next stop. The energized relay M also opens its contact members M7 thereby deenergizing the inductor relay I so that it will not operate to prepare any door motor circuits until the car gets to the stop at the second floor.

The energized relays D and M close their contact members D1, D2, M1 and M2 to energize the motor 15 to start the car in the down direction and the closing of the contact members M3 energizes the coil 18 to release the brake 17 so that the motor 15 can move the car downwardly.

The car starts down, and as it does, it causes its floor selector brush 36 to leave the contact segment 4f and engage the contact segment 3f thereby deenergizing the down stopping relay 4DS and energizing the down stopping relay 3DS. As the car continues downwardly, the brush 36 is moved from the contact segment 3f into engagement with the contact segment 2f thereby deenergizing the down stopping relay 3DS and energizing the down stopping relay 2DS.

The energization of the stopping relay 2DS causes the car A to be decelerated and stopped at the second floor, as follows: The energized relay 2DS opens its contact members 2DS2 thereby deenergizing the direction preference relay DP and also opens its contact members 2DS1 thereby deenergizing the relays D and M. This is effected because when the call relay 2C was energized, it opened its contact members 2C1 in one of the two parallel circuits for relays D and M and now that the contact members 2DS1 are opened in the other parallel circuit for the relays D and M, those relays are deenergized.

The deenergized relay D opens its contact members D1 and D2 thereby deenergizing and stopping the motor 15. The deenergized relay M opens its contact members M3, thereby deenergizing the brake coil 18 to apply the brake 17 to stop the car. The deenergized relay M also opens its contact members M5 thereby deenergizing the hesitating relay TE which opens its contact members TE1 (Fig. 3) to prevent the car from being restarted until after the expiration of a predetermined time. The deenergized relay M also closes its contact members M6 (Fig. 4) to energize the cancellation coil 2CM thereby neutralizing the coil 2C and cancelling the call registered on the car button 2E. The deenergized relay M also closes its contact members M7 thereby energizing the inductor relay I to close the switch contact members 2G2 and 2G1 to prepare the circuits for operating the hatchway door motor for car A at the second floor.

The car is now stopped at the second floor and the automatic opening of the car gate and door is effected because the deenergized relay M also opens its contact members M8 to deenergize the door control relay W. The deenergized relay W closes its contact members W2 thereby energizing the door opening relay DO which closes its contact members DO3 and DO4 thus energizing the armature NA and the field winding NF of the control motor, the armature ZA and the field winding ZF of the gate motor, and the armature 2TA and the field winding 2TF of the hatchway door motor. These energized motors now cause the car gate and the hatchway door for car A at the second floor to move to their open position. As the gate and door open, they open their contact members 2—54 and 55 thereby deenergizing the gate interlock relay Q to prevent operation of the car while the door and gate are open. As the door and gate reach their full open position, the control motor opens the limit switch OL thereby deenergizing the door opening relay to open its contact members DO3 and DO4, thus deenergizing and stopping the control motor, the hatchway door motor and the car gate motor.

The passenger now steps out of the car and after the expiration of the predetermined time delay of the contact members DO1 of the deenergized relay DO, they close and thereby energize the door closing relay DC to reclose the door and gate. This is effected by the energized relay DC closing its contact members DC2 and DC3 thus energizing the control motor, the hatchway door motor and the car gate motor for operation in the closing direction. As the door and gate reach their closed position, the control motor operates the closing limit switch CL thereby deenergizing the door closing motor DC to reopen its contact members DC2 and DC3 thus deenergizing and stopping the control motor, the door motor and the gate motor. Also, as the door and gate reach their closed position, they close their safety contact members 2—54 and 55, thereby again energizing the door and gate interlock relay Q so that the car is again ready for operation in the usual manner.

Referring again to the deenergized relay M, it closed its contact members M6 as the car arrived and stopped at the second floor and thereby energized the cancellation coil 2CN which deenergized the car registering coil 2C to open its holding contact members 2C4 and thereby deenergized the cancellation coil 2CN and thus cancelled the call the passenger had placed on button 2E. The deenergization of the car call coil 2CN also caused it to close its contact members 2C5 for energizing the auxiliary car preference relay Y. When the down preference relay DP was deenergized, it closed its contact members DP1 for energizing the up direction stopping relay 2US, it closed its contact members DP3 for preparing the sequence conductor 60 for operation, and it closed its contact members DP4 and DP5 to restore the circuits of car A so that the car will respond while standing at the second floor to any call placed at that floor or above it.

By the foregoing operations it is seen that we have provided an improved automatic elevator system in which the cars may be parked with their doors and gates closed ready to answer immediately any calls at other floors without having to wait to close their gates or doors after the call is received; that the system may be so set that a selected car will be the first to answer when both cars are parked at one floor; that only the door and gate of the selected car will open, when both cars are parked at one floor and a call is entered at that floor; and that, when only one of a plurality of cars is parked at a floor having a hall button common to all the cars, the door and gate of that car will open when a call is placed on that common button.

Although we have illustrated and described only one specific embodiment of our invention, it is to be understood that many changes therein and modifications thereof may be made without departing from the spirit and scope of the invention.

We claim as our invention:

1. In an elevator system for operating a plurality of cars past a plurality of floors, a call device at each floor common to all the cars, a hatchway door at each floor for each car, a car door for each car, and selective means responsive to operation of the call device at any floor at which any one and only one of the cars is standing with its car door and its hatchway door closed for opening only that hatchway door and only the car door of that car.

2. In an elevator system for operating a plurality of cars past a plurality of floors, a call device at each floor common to all the cars, a hatchway door at each floor for each car, and a selective means responsive to operation of a call device at any floor at which any one and only one of the cars is standing with its hatchway door closed for opening only that hatchway door.

3. In an elevator system for operating a plurality of cars serving a plurality of floors a control device at each floor common to all the cars, a starting and a stopping means for each car, means responsive to operation of a control device at a floor for causing the starting and the stopping means of a car to move it to and stop it at the floor of the operated control device, a hatchway door for each car at each floor, a car door for each car, power means for each car responsive to the stopping of that car at a floor for. opening and closing the car door and the hatchway door of that car at that floor, and selective means responsive to operation of said common control device at that floor for causing the power means to reopen the doors for that car at that floor when it is the only car at that floor, regardless of which car it may be.

4. In an elevator system for operating a plurality of cars serving a pair of terminal floors and a plurality of intervening floors, a call device at each terminal floor common to all the cars, an up and a down call device at each intervening floor common to all the cars, a car door for each car, a hatchway door at each floor for each car, power means associated with each car for operating the car door and the hatchway doors associated with each car, and selective means responsive to operation of a common control device at any floor at which only one car is standing and the doors of that car are closed for causing the power means associated therewith to open the doors of that car, regardless of which car it may be.

5. In an elevator system for operating a plurality of cars past a plurality of floors, a call device at each floor common to all the cars, a hatchway door at each floor for each car, a car door for each car, and means responsive to operation of a call device at any floor at which a plurality of cars are standing with their doors closed for openings the doors for only one of said plurality of cars.

6. In an elevator system for operating a plurality of cars past a plurality of floors, a call device at each floor common to all the cars, a hatchway door at each floor for each car, a car door for each car, means responsive to operation of a call device at any floor at which a plurality of cars are standing with their doors closed for opening the doors for only one of said plurality of cars, and means for preselecting the car for which the doors will be opened when a plurality of cars are standing at a floor with their doors closed.

7. In an elevator system for operating a plurality of cars past a plurality of floors, a call device at each floor common to all the cars, a hatchway door at each floor for each car, a car door for each car, means responsive to operation of a call device at any floor at which a plurality of cars are standing with their doors closed for opening the doors for only one of said plurality of cars, a preselecting means for selecting the car for which the doors will be opened, and a manualy operated means for setting the preselecting means to determine which car shall be selected.

8. In an elevator system for operating a plurality of cars serving a plurality of floors, a call device at each floor common to all the cars, starting and stopping means for each car, means responsive to operation of a call device at any floor for causing the starting and stopping means of the nearest car to move it to and stop it at the floor of the operated call device, a car door for each car, a hatchway door for each car at each floor, power means responsive to the stopping of a car at a floor for opening and closing the car door and the hatchway door of that car at that floor, a door-opening relay for each car, an auxiliary door relay for each car responsive to operation of a common call device at a floor at which only one car is standing with its car door and its hatchway door closed for energizing the door-opening relay of that car to control the power means associated with that car to open its car door and its hatchway door, regardless of which car it may be.

9. In an elevator system for operating a plurality of cars serving a pair of terminal floors and a plurality of intervening floors, a call device at each terminal floor common to all the cars, an up call device and a down call device at each intervening floor common to all the cars, starting and stopping means for each car, means responsive to operation of a call device at any floor for causing the starting and stopping means of the nearest approaching car to move it to and stop it at the floor of the operated call device, a hatchway door for each car at each floor, power means responsive to the stopping of a car at a floor for opening and closing the hatchway door for that car at that floor, means for preselecting the car for which the doors will be opened when a plurality of cars are standing at a floor with their doors closed and the door for one car is to be opened, a door-selecting relay connected to be operated by the position of a plurality of cars at a floor, and means responsive to operation of the door-selecting relay and to operation of a call device at a floor at which a plurality of cars are standing with their hatchway doors at that floor closed, for causing the power means associated with the preselected car to open the hatchway door of that car at that floor.

10. In an elevator system for operating a plurality of cars serving a pair of terminal floors and a plurality of intervening floors, a call device at each terminal floor common to all the cars, an up call device and a down call device at each intervening floor common to all the cars, starting and stopping means for each car, means responsive to operation of a call device at any floor for causing the starting and stopping means of the nearest approaching car to move it to and stop it at the floor of the operated call device, a hatchway door for each car at each floor, power means responsive to the stopping of a car at a floor for opening and closing the hatchway door for that car at that floor, and means comprising an auxiliary door relay for each car, a car preference relay for each car and a door selecting relay responsive to operation of a call device common to all the cars at a floor at which a plurality of cars are standing with their hatchway doors at that floor closed for causing the power means associated with a selected car to open the hatchway door of that car at that floor and responsive to operation of a call device common to all the cars at a floor at which only one car is standing with its hatchway door closed for causing the power means associated with that car to open the hatchway door for that car at that floor.

CHARLES F. CARNEY.
JAMES M. GASPRICH.